United States Patent

[11] 3,615,320

[72] Inventors: Albert E. Junge, New Kensington; Arnold J. Thimons, Natrona Heights; Donald R. Wenkhous, Gibsonia, all of Pa.
[21] Appl. No. 705,186
[22] Filed Feb. 13, 1968
[45] Patented Oct. 26, 1971
[73] Assignee PPG Industries, Inc. Pittsburgh, Pa.

[54] STRENGTHENED GLASS ARTICLE AND PROCESS FOR MAKING
8 Claims, 1 Drawing Fig.

[52] U.S. Cl. .................................................... 65/30, 65/114, 65/117, 117/124, 161/1
[51] Int. Cl. ........................................................ C03c 21/00
[50] Field of Search ............................................ 65/30, 114; 117/124; 161/1

[56] References Cited
UNITED STATES PATENTS
3,357,876  12/1967  Rinehart ........................ 65/30 X FOREIGN PATENTS
2,352  3/1962  South Africa .................. 65/30
2,353  3/1962  South Africa .................. 65/30

OTHER REFERENCES
McMillan, P. W., " Glass-Ceramics," Academic Press, New York, N.Y., 1964, pp. 12– 15, 74– 79.
Shand, E. B., " Glass Engineering Handbook," McGraw-Hill, New York, N.Y., 1958, pp. 106– 109.

Primary Examiner—S. Leon Bashore
Assistant Examiner—John H. Harman
Attorney—Chisholm and Spencer ABSTRACT: The invention relates to a novel glass composition and methods of strengthening glass articles thereof by ion exchange techniques. More particularly, this invention relates to lithia-alumina-silica glasses containing soda and boric oxide which can be melted and formed by conventional techniques, then strengthened by ion exchange of relatively large alkali metal ions from an external source for smaller alkali metal ions of the glass while maintaining the temperature of said glass below its strain point.

EFFECT OF COMPOSITION ON THE ACID DURABILITY OF SIMPLE GLASSES IN THE $nSiO_2 \cdot Al_2O_3 \cdot Li_2O$ SYSTEM

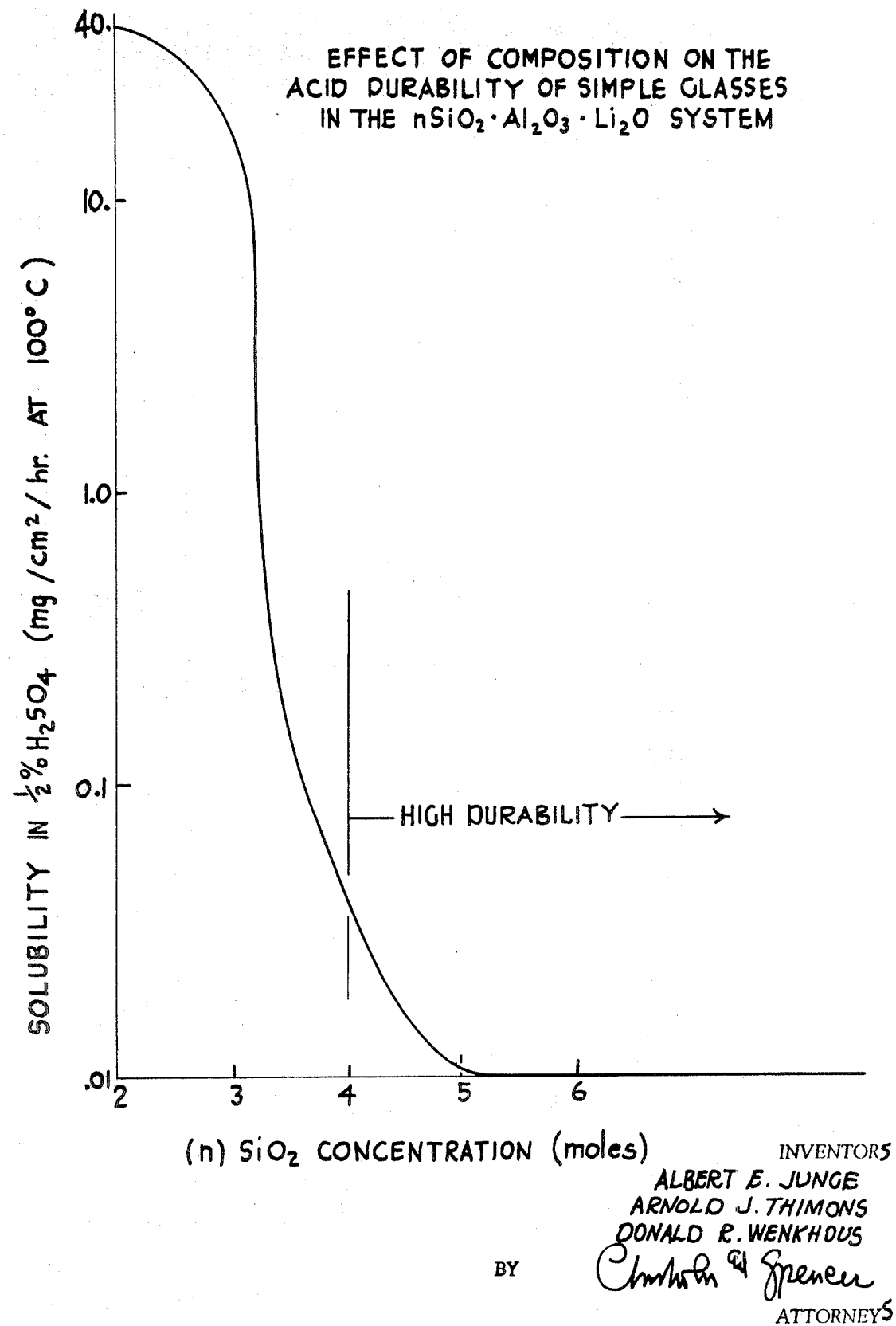

STRENGTHENED GLASS ARTICLE AND PROCESS FOR MAKING

PRIOR ART

It is known in the art that certain lithia-alumina-silica glasses have excellent ion exchange characteristics and that strengthened glasses can be readily produced therefrom. South African application Nos. 62/2352 and 62/2353 disclose various lithia-alumina-silica compositions. The compositions disclosed therein, however, are quite refractory; that is, they melt (melting for glass being that viscosity the log of which is 2.5 or less) only at very high temperatures; that is, above 2850° F.

Such compositions cannot be melted and formed by conventional techniques. For example, the liquidus temperature and temperature at which the log viscosity is 4 are so high that the glasses would not be amenable to a conventional vertical-draw sheet glass process wherein temperature control of the glass is very important and small variations in temperature result in variations in thickness in the sheet formed. At the very high temperatures required for forming glasses disclosed in the above South African patents, it would be difficult to maintain the temperature of the glass in the proper range because heat loss by radiation increases proportionately to the fourth power of the temperature, i.e., $T^4$.

Average melt temperatures above 2850° F. cause rapid deterioration of the refractory walls of furnaces designed for soda-lime-silica glasses. Fining (log 2) for refractory glasses requires very high temperatures, e.g., frequently above 3000° F. It is possible, however, to form plate glass by flowing refractory glass on rolls and subjecting the glass to grinding and polishing which is an expensive operation. However, the very high melting and fining temperatures still present a problem.

A further problem in processing glasses having a high liquidus temperature occurs during bending of glass sheets. Such glasses have a tendency to crystallize at the elevated temperatures required for bending.

In copending application of D. W. Rinehart, Ser. No. 426,676, filed Jan. 19, 1965, now U.S. Pat. No. 3,357,876, lithia-alumina-silica- $P_2O_5$-soda glasses are disclosed which melt and form in conventional glass making equipment and have excellent ion exchange properties. These glasses have attributes which are not found in the refractory glasses described above. However, exterior durability of these glasses is less than that of the refractory glasses.

INVENTION

The instant invention pertains to lithia-alumina-silica glasses of the following compositional range:

59–62    percent by weight $SiO_2$
    18–23    percent by weight $Al_2O_3$
    4–5.5 percent by weight $Li_2O$
    7–9 percent by weight $Na_2O$
    3–5 percent by weight $B_2O_3$
    0–2 percent fining agents having melting and forming characteristics compatible with conventional melting and forming apparatus, especially sheet melting and forming equipment. These glasses further have excellent durability and meet the requirements for viewing closures for transport carriers of various types.

This invention comprises a method of producing strengthened glass articles by: (a) melting at a temperature of about 2500° F. to about 2700° F. a glass base of the above compositions, (b) fining said molten glass at a temperature slightly above its melting temperature and generally at a temperature below about 2900° F., (c) forming sheets of said molten glass maintained at a temperature from about 1850° F. to about 2100° F., (d) annealing said glass sheets by conventional means, (e) and strengthening said annealed glass sheet by exchange of a relatively large metal ion from an external source for a smaller ion of the glass while maintaining said glass below its strain point for a sufficient period of time to achieve a useful surface compressive stress.

The composition of the glass of this invention is essential in obtaining the desired properties. Lithia is important as a source of smaller ions to be exchanged for larger alkali metal ions from an external source and also is the foremost flux for a high alumina glass. Alumina in the above quantities is important to simultaneously enhance the ion exchange rate, retard relaxation, and enhance the strength of the glass while silica in the above quantities is necessary to enhance the durability of the glass. Soda is included in a range of 7–9 percent by weight to lower the liquidus temperature while maintaining proper viscosity and, thereby, provide a relatively wide working range for drawing of the glass. Working range for sheet glass is defined as the difference in temperature between the log 4 viscosity temperature and the liquidus temperature for drawing. Boric oxide in the above-stated amounts aids in lowering the liquidus temperature and reducing viscosity at working temperatures. It further aids in improving the durability and meltability of the glass.

Minor quantities of other glass forming materials and glass modifiers may be included in the glass composition of this invention. For example, the following oxides may be included: MgO, MnO, ZnO, ZrO, $TiO_2$, $Sb_2O_3$, $As_2O_3$, $K_2O$, $P_2O_5$, PbO, and the like. The total quantity of additional ingredients should not exceed 5.0 percent by weight of the glass composition. Greater quantities will adversely affect the advantageous melting, forming, and strengthening characteristics of the glass.

Certain materials such as $As_2O_3$, NaCl, $Sb_2O_5$, $Al_2(SO_4)_3$ and the like will generally be included in quantities of less than about 2.0 percent by weight in the glass compositions of this invention for the purpose of aiding in fining of the glass.

A comparison of the properties of a typical glass of the instant invention and a refractory glass commercially available in strengthened form is set forth on the following page.

A further advantage of the glasses of the instant invention is illustrated by the solubility curve depicted in the FIGURE. This curve indicates the variation in solubility of $1Li_2O:1Al_2O_3:nSiO_2$ glasses as a function of $SiO_2$ content. The solubility of such glasses in aqueous media (acidic, neutral, or alkaline) increases substantially below a silica content of about four moles. For the $1Li_2O-1Al_2O_3-nSiO_2$ glasses, 66.6 mole percent is equal to 4. The glasses of the instant invention have a silica content of about this quantity (3.885 moles or 64.7 mole percent) and are significantly more durable than glasses having a lower silica content.

| Ingredients | Composition A Commercial Refractory Glass | Composition B Glass of This Invention |
|---|---|---|
| $SiO_2$ | 61.4 | 62.0 |
| $Al_2O_3$ | 23.8 | 20.1 |
| $Li_2O$ | 3.28 | 4.8 |
| $Na_2O$ | 8.2 | 7.9 |
| $B_2O_3$ | | 4.6 |
| MgO | 1.9 | |
| CL | | 0.5 |
| $As_2O_3$ | | 0.1 |
| Properties | | |
| Liquidus Temperature | 2080° F. | 1855° F. |
| Strain Point | 1111° F. | 860° F. |
| Annealing Point | 1212° F. | 930° F. |
| Softening Point | 1572° F. | 1250° F. |
| Log 4 Viscosity Temperature | 2340° F. | 1925° F. |
| Log 3.5 Viscosity Temperature | 2500° F. | 2300° F. |

It is significant that the increased durability has been achieved without a loss of melting and forming properties. Refractory glasses of the $Li_2O-Al_2O_3-SiO_2$ type have good durability when containing proper amounts of $SiO_2$ but suffer from poor melting, forming, and fabrication characteristics.

An additional advantageous feature of the glasses of this invention is the increased strength achieved by annealing, especially for long periods of time, prior to ion exchange of an alkali metal ion of the glass for a larger one from an external source. In an unannealed condition, the glasses disclosed herein exhibit a significant increase in strength when, for example, a large alkali metal from an external source is exchanged for a smaller alkali metal of the glass while the glass is maintained at a temperature below its strain point. However, upon annealing by conventional techniques for the usual time periods, a very significant increase in strength is noted when these glasses are subjected to a similar ion exchange strengthening process.

The effect of extended annealing upon ultimate strength is significant with the glasses of this invention. Ordinary glasses, e.g., lime-soda-silica and lithia-alumina-silica glasses, exhibit an increase in over-all strength when annealed for very long periods of time before strengthening by ion exchange techniques; however, the strength of glasses of this invention is markedly increased by annealing for long periods of time prior to ion exchange strengthening techniques.

Extended annealing is known to increase slightly the density of glasses; therefore, this process is frequently referred to as densification, and the glasses so treated are referred to as being densified. Densification increases the density usually from about 1 percent to about 10 percent. The density of the glasses of this invention prior to any treatment is about 2.5.

The articles produced by extending annealing and ion exchange strengthening have a surface layer in compression and an interior tensile stress zone. The surface layer contains a greater quantity of larger alkali metal ions, e.g., sodium, than the interior zone because the exchange of larger alkali metal ions from an external source for smaller alkali metal ions, e.g., lithium, occurs primarily at the surface of the glass with the concentration of larger alkali metal ions decreasing with increasing distance from the glass surface. The composition of the tensilely-stressed interior of the glass is substantially unaffected by the alkali metal ion exchange occurring at the surface, thus the interior zone has substantially the same composition as the original glass.

The following examples specifically illustrate the instant invention; however, it is not intended that this invention be limited to these specific examples, but is to include all modifications and variations described hereinabove.

EXAMPLE I

A ceramic crucible was filled with the following raw materials:

| Material | Weight of Material In Grams |
|---|---|
| Agate sand | 372.0 |
| Al(OH)$_3$ | 183.6 |
| Li$_2$CO$_3$ | 74.8 |
| Na$_2$CO$_3$ | 82.4 |
| H$_3$BO$_3$ | 53.6 |

The crucible containing the above materials was placed in a furnace at 2600° F. for a period of about 1½ hours. At the end of this period, the molten glass was quenched in water. The glass was then remelted and quenched again. The glass was remelted a second time and finally quenched. The fragments of glass were placed in a platinum crucible for the purpose of fining. The glass was heated to a temperature of about 2600° F.

Rods and plates were formed from the above glass. Rods were drawn from the crucible while the plates were cast. The plates were annealed by placing in a furnace heated to 1100° F., removing power from the furnace and allowing the glass and furnace to cool for a period of about 16 hours.

Unannealed rods of the above glass were strengthened by immersion in sodium nitrate at 750° F. for various periods of time. The following table contains data on the strengthened rods:

TABLE I

| Number of Rods Tested | Immersion Time | Average Unabraded MOR (p.s.i.) | Penetration (Microns) |
|---|---|---|---|
| 8 | 64 min. | 49,189 | 115 |
| 9 | 256 min. | 48,533 | 255 |
| 9 | 64 min. | 56,118 | 130 |
| 7 | 256 min. | 55,779 | 240 |
| 8 | 36 min. | 71,651 | 100 |

The modulus of rupture was calculated for the above 2-millimeter diameter rods using the following formula:

$$MOR = (2aL/\pi r^3)$$

wherein $L$ equals breaking load in pounds; $r$ equals radius of the rods (in inches), $2a$ is the total distance in inches between the inner load points and the outer support points in the four-point loading system employed.

Plates 2⅛ inches by 2⅛ inches were formed from the above composition and annealed as described above. These plates were in excess of 0.120 inch thick. The plates were first ground with W-170 garnet to a thickness of about 0.118 inch. Successive removals of 0.06 inch were made with W-2 and W-5 garnet to a thickness of 0.106 inch. About 0.004 inch was removed by grinding with W-6 garnet; W-8 garnet was used to remove the final 0.002 inch. The plates now had a thickness of 0.100 inch and were polished with a zirconium oxide slurry comprising about 1.0 percent ZrO$_2$ in a 0.75 percent by weight aqueous solution of ZrOCl$_2$.

The ground and polished plates were then ion exchanged for 270 min. at 750-760° F. in sodium nitrate. The following table depicts the strength characteristics of the ion exchange treated plates. Samples 101, 102, and 103 were not abraded, while samples 111, 112, and 113 were abraded. The above plates were tested for strength by the concentric ring method wherein a 2-inch ring is placed on one side of the glass and a 1-inch ring is placed on the other side.

TABLE II

| Sample | Plate Thickness (Inches) | Center Tension | Breaking Load (Pounds) | Breaking Stress (p.s.i.) |
|---|---|---|---|---|
| 101 | 0.1088 | 1700 μ/in. | 1375 | 63,190 |
| 102 | 0.1090 | 1700 μ/in. | 1450 | 66,390 |
| 103 | 0.1050 | 1770 μ/in. | 1530 | 75,490 |
| 111 | 0.1055 | 1760 μ/in. | 790 | 38,610 |
| 112 | 0.1085 | 1780 μ/in. | 860 | 39,740 |
| 113 | 0.1108 | 1710 μ/in. | 900 | 39,880 |

The optical stress indicated above for center tension was measured by birefringence using a graduated quartz wedge (prism) calibrated in millimicrons. Thin sections of test plates are mounted on the stage of a petrographic microscope (one containing a polarizing element built to the optical system below the stage surface) equipped with the quartz wedge. Index matching fluid, viz., oil having the same index of refraction as the glass plate, is placed on the glass surface. The glass test plate specimen is then mounted on a microscope slide so that either major surface (upper or lower) of the test plate is perpendicular to the first surface of the slide. The zone of the sample to be measured is selected and the optical retardation and depth of that zone are measured by viewing through that zone. The appropriate optical retardation in millimicrons is obtained by reading it from the calibrated quartz wedge. The appropriate depth at which a given optical retardation exists in a given zone is obtained by means of an eyepiece calibrated in microns. Since the test plates are less than 1 inch thick, the measured values of retardation are converted by multiplying the value by the appropriate factor to express this stress in terms of millimicrons per inch.

The oxide composition of the above glass as calculated from the batch materials is as follows:

| Oxide | Weight Percent |
|---|---|
| $SiO_2$ | 62.0 |
| $Al_2O_3$ | 20.0 |
| $Li_2O$ | 5.0 |
| $Na_2O$ | 8.0 |
| $B_2O_3$ | 5.0 |

EXAMPLE II

The following ingredients were melted in an 18-inch ceramic pot:

| Ingredient | Weight In Pounds |
|---|---|
| Supersil sand | 867 |
| Lithium carbonate | 175 |
| Soda ash | 165 |
| Alumina hydrate | 429 |
| Boric acid | 124 |
| Common salt | 25 |
| Sodium nitrate | 10 |
| Arsenic trioxide | 5 |

The following indicates the calculated composition of a glass melted from the above materials:

| Oxide | Percent By Weight |
|---|---|
| $SiO_2$ | 61.40 |
| $Na_2O$ | 8.03 |
| $Li_2O$ | 4.97 |
| $Al_2O_3$ | 20.02 |
| $B_2O_3$ | 4.95 |
| Cl | 0.51 |
| $As_2O_3$ | 0.11 |
| $Fe_2O_3$ | 0.01 |

Because the bulky batch materials were more voluminous than the melting pot, the above ingredients were melted in the following manner: one quarter of the raw materials was placed in the crucible at 2390° F. and heated for a period of about an hour and 15 minutes; the second quarter of the raw materials was then added at a temperature of 2620° F. and the pot was heated for about another hour at which time the third quarter of the materials was added at a temperature of 2680° F. The pot was heated an additional half hour and the fourth quarter of the materials was added at a temperature of 2690° F. The heating was continued for about another hour with temperatures reaching 2730° F. The materials were heated for an additional hour with stirring at 35 r.p.m. The temperature was then reduced to 2300° F. and allowed to remain there for a period of about one half hour. The temperature was then raised to 2400° F. and the glass was cast as large plates. These plates were placed in a furnace at 1100° F. and annealed by allowing the furnace and glass to cool to room temperature.

The cast plates were about 30 inches by 30 inches by three-eighths inch. Smaller plates of 2⅛ inch by 2⅛ inch were cut from the larger plates. The plates were ground and polished as described in Example I above until a thickness of about 0.100 was obtained.

The plates were strengthened by immersion in sodium nitrate at a temperature of 750° F. while the lithium concentration of the bath was maintained below 0.015 percent. A first group of plates was allowed to remain in the same nitrate bath for a period of 144 min.; a second group of plates was allowed to remain in the bath for 324 min.; while a third group remained in the bath for a period of 960 min. An abraded strength of 32,500 was obtained for three samples of the first group, a strength of 37,400 was obtained for three samples of the second group, and a strength of 38,600 was obtained for three samples of the third group. These strengths indicate the strength of abraded plates tested by the concentric ring loading method.

The durability of some of the above plates was tested by immersion in one-half percent sulphuric acid at 100° C. for a period of a half hour. The plates indicated a loss of 0.012 milligrams per square centimeter per hour before ion exchange. After ion exchange, the plates showed a loss of 0.026 milligrams per centimeter square per hour.

EXAMPLE III

Glass articles prepared from the composition of this invention were found to have improved strengths when densified, i.e., annealed for an extended period of time, before ion exchange treatment. To illustrate this phenomenon, unabraded strengths were determined for unannealed and annealed 2-millimeter diameter glass rods of the following composition:

| Ingredient | Percent By Weight |
|---|---|
| $SiO_2$ | 62.0 |
| $Al_2O_3$ | 20.1 |
| $Li_2O$ | 4.8 |
| $Na_2O$ | 7.9 |
| $B_2O_3$ | 4.6 |
| cl. | 0.5 |
| $As_2O_3$ | 0.1 |

A set of 10 rods was used in each strength determination. Sets A, C, E, and G were strengthened as drawn. Sets B, D, F, and H were densified before strengthening. Strengthening was accomplished in all cases by immersion of a glass rod in $NaNO_3$ at 750° F. The following data resulted from these experiments:

| Set | Annealing Conditions | | Ion Exchange Time (750° F.) | Avg. MOR (psi) Set of Ten | Standard Deviation |
|---|---|---|---|---|---|
| | Time | Temp. | | | |
| A | None | | 36 min. | 69,694 | 7846 |
| B | 7 days – 17 hrs. | @ 825° F. | 36 min. | 95,103 | 6100 |
| C | None | | 81 min. | 62,704 | 6808 |
| D | 7 days – 16 hrs. | @ 825° F. | 81 min. | 88,323 | 8512 |
| E | None | | 225 min. | 63,115 | 7935 |
| F | 7 days – 19 hrs. | @ 825° F. | 225 min. | 82,164 | 7519 |
| G | None | | 16 hrs. | 46,916 | 4140 |
| H | 7 days | @ 825° F. | 16 hrs. | 71,390 | 6318 |

Densification occurs by annealing for very long periods of time as, for example, several days. Rods of sets B, D, F, and H were annealed for over 7 days.

The above experiments indicate that densification enhances strength retention at high temperatures, especially during long periods of immersion in a high-temperature ion exchange bath.

In the above experiment, the strength of an annealed rod immersed for 16 hours in $NaNO_3$ had a strength of more than 155 percent that of the unannealed rod while those rods immersed for 36 minutes showed only an increase of about 140 percent for the annealed rod. This is an important property inasmuch as increased periods of immersion in the molten alkali metal salt increases penetration of the larger alkali metal ion into the surface of the glass, thereby creating a deeper compression layer. Thus, the glasses of this invention offer the combination of high strength and deep surface compression. The deep surface compression provides greater strength after severe abrasion.

In the above examples, abraded 2 inch × 2 inch squares were abraded on the surface to be tested in tension with 2 cubic centimeters of 100B Alundum at 30 p.s.i. for 5 seconds. The abraded area is three-fourth inch in diameter, located in the geometric center of the squares.

The glasses of this invention have been found to be dissimilar from prior art ion exchange glass compositions in that annealing prior to ion exchange strengthening produces a noticeable improvement in the overall strength of the strengthened article, especially glass articles which are ion exchanged for long periods of time. Although this characteristic is most noticeable when the glass articles are annealed for extended periods, the effect is nevertheless present in glass articles of this invention when annealed according to normal annealing schedules.

While specific examples of the invention have been set forth hereinabove, it is not intended to limit the invention solely thereto, but to include all of the variations and modifications falling within the scope of the appended claims.

We claim:

1. In a method of strengthening an alkali metal containing flat glass article by exchange of relatively large ions from an external source for smaller alkali metal ions of the glass while maintaining said glass below the strain point for a sufficient period of time to achieve a useful surface compressive stress, the improvement comprising the use of a glass consisting essentially of the following composition:

| $SiO_2$ | 59-62 | percent by weight |
|---|---|---|
| $Al_2O_3$ | 18-23 | percent by weight |
| $Li_2O$ | 4-5.5 | percent by weight |
| $Na_2O$ | 7-9 | percent by weight |
| $B_2O_3$ | 3-5 | percent by weight | and having a $\log_{10}$ viscosity of 4.0 at a temperature below about 2900° F., having a maximum solubility in 0.5 weight percent $H_2SO_4$ at 100° C. of about 0.06 milligram per square centimeter per hour, including fining the glass in a molten state at a temperature slightly above the melting temperature but below 2900° F. and forming the flat glass at a temperature of from about 1850° F. to about 2100° F. by a conventional method of forming flat glass.

2. In a process for strengthening curved alkali metal containing flat glass articles by softening a glass sheet at a temperature near its softening point, bending said glass sheet to a desired configuration, and subsequently strengthening said glass article by exchange of relatively large ions from an external source for smaller alkali metal ions of the glass while maintaining said glass below its strain point for a sufficient period of time to achieve a useful surface compressive stress, the improvement comprising the use of a glass consisting essentially of the following composition:

| $SiO_2$ | 59-62 | percent by weight |
|---|---|---|
| $Al_2O_3$ | 18-23 | percent by weight |
| $Li_2O$ | 4-5.5 | percent by weight |
| $Na_2O$ | 7-9 | percent by weight |
| $B_2O_3$ | 3-5 | percent by weight | and having a log 10 viscosity of 4.0 at a temperature below about 2900° F., having a maximum solubility in 0.5 weight percent $H_2SO_4$ at 100° C. of about 0.06 milligram per square centimeter per hour, including fining the glass in a molten state at a temperature slightly above the melting temperature but below 2900° F. and forming the flat glass at a temperature of from about 1850° F. to about 2100° F. by a conventional method of forming flat glass.

3. A method of producing strengthened, flat glass having a maximum solubility in 0.5 weight percent $H_2SO_4$ at 100° C. of about 0.06 milligram per square centimeter per hour, comprising:

a. melting at a temperature of about 2500° F. to about 2700° F. a glass base of a composition consisting essentially of:

| $SiO_2$ | 59-62 | percent by weight |
|---|---|---|
| $Al_2O_3$ | 18-23 | percent by weight |
| $Li_2O$ | 4-5.5 | percent by weight |
| $Na_2O$ | 7-9 | percent by weight |
| $B_2O_3$ | 3-5 | percent by weight | b. fining said molten glass at a temperature slightly above the melting temperature but below 2900° F.;
c. forming sheets of said molten glass maintained at a temperature of from about 1850° F. to about 2100° F. by a conventional method of forming flat glass;
d. annealing said glass sheets; and
e. strengthening said annealed glass sheets by exchanging a relatively large metal ion from an external source for a smaller ion of the glass while maintaining said glass below its strain point for a sufficient period of time to achieve a surface compressive stress.

4. The method of claim 3 wherein the annealing is conducted for a period of several days such that the ultimate strength of the glass is markedly increased.

5. The method of claim 3 wherein the large alkali metal ion is sodium and the smaller ion is lithium.

6. A method of producing strengthened, flat glass having a maximum solubility in 0.5 weight percent $H_2SO_4$ at 100° C. of about 0.06 milligram per square centimeter per hour, comprising:

a. melting at a temperature of about 2500° F. to about 2700° F. a glass base of a composition consisting of:

| $SiO_2$ | 59-62 | percent by weight |
|---|---|---|
| $Al_2O_3$ | 18-23 | percent by weight |
| $Li_2O$ | 4-5.5 | percent by weight |
| $Na_2O$ | 7-9 | percent by weight |
| $B_2O_3$ | 3-5 | percent by weight | b. fining said molten glass at a temperature slightly above the melting temperature but below 2900° F.;
c. forming sheets of said molten glass maintained at a temperature of from about 1850° F. to about 2100° F. by a conventional method of forming flat glass;
d. annealing said glass sheets; and
e. strengthening said annealed glass sheets by exchanging a relatively large metal ion from an external source for a smaller ion of the glass while maintaining said glass below its strain point for a sufficient period of time to achieve a surface compressive stress.

7. A densified, strengthened glass article having at least two alkali ions therein, one larger ionic diameter than the other, comprising:

a. a surface layer in compression and an interior tensile stress zone;
b. said surface layer containing a larger quantity of larger alkali ions than said interior zone; and
c. said interior zone consisting essentially of a composition of

| $SiO_2$ | 59-62 | percent by weight |
|---|---|---|
| $Al_2O_3$ | 18-23 | percent by weight |
| $Li_2O$ | 4-5.5 | percent by weight |
| $Na_2O$ | 7-9 | percent by weight |
| $B_2O_3$ | 3-5 | percent by weight |

8. The glass of claim 7 wherein the larger alkali metal ion is sodium.

PO-1050
(5/69)

UNITED STATES PATENT OFFICE
CERTIFICATE OF CORRECTION

Patent No. 3,615,320      Dated October 26, 1971

Inventor(s) Albert E. Junge, Arnold J. Thimons and Donald R. Wenkhous

It is certified that error appears in the above-identified patent and that said Letters Patent are hereby corrected as shown below:

Column 7, line 66, that portion of Claim 2 reading "log 10" should read -- $\log_{10}$ --.

Column 8, line 68, that portion of Claim 7 reading "$B_2O_3$ 3-5 percent by weight" should have inserted after "weight" -- and having a fining temperature below 2900°F. --.

Signed and sealed this 6th day of June 1972.

(SEAL)
Attest:

EDWARD M. FLETCHER, JR.
Attesting Officer

ROBERT GOTTSCHALK
Commissioner of Patents